United States Patent
Englander et al.

(10) Patent No.: US 9,862,322 B2
(45) Date of Patent: Jan. 9, 2018

(54) MIRROR ASSEMBLY AND ADJUSTMENT MECHANISM THEREOF

(71) Applicant: ROSCO, INC., Jamaica, NY (US)

(72) Inventors: Benjamin Englander, Woodmere, NY (US); Julian Serer, Plainview, NY (US)

(73) Assignee: ROSCO, INC., Jamaica, NY (US)

( * ) Notice: Subject to any disclaimer, the term of this patent is extended or adjusted under 35 U.S.C. 154(b) by 1072 days.

(21) Appl. No.: 13/875,625

(22) Filed: May 2, 2013

(65) Prior Publication Data

US 2013/0293975 A1 Nov. 7, 2013

Related U.S. Application Data

(60) Provisional application No. 61/641,581, filed on May 2, 2012.

(51) Int. Cl.
*B60R 1/06* (2006.01)

(52) U.S. Cl.
CPC .......... *B60R 1/0605* (2013.01); *B60R 1/0612* (2013.01); *Y10T 29/49826* (2015.01)

(58) Field of Classification Search
CPC ....... B60R 1/00–1/089; G02B 26/08–26/0891; G02B 7/1827; G02B 7/1828; G02B 7/1822; G02B 7/198
See application file for complete search history.

(56) References Cited

U.S. PATENT DOCUMENTS

| | | | |
|---|---|---|---|
| 3,530,495 A | 9/1970 | Kindel | |
| 4,889,308 A | 12/1989 | Gillet | |
| 5,479,297 A * | 12/1995 | Summers | B60R 1/025 359/841 |
| 5,600,497 A * | 2/1997 | Leonberger | B60R 1/066 248/481 |
| 5,680,262 A * | 10/1997 | Soliday | B29C 55/10 359/840 |
| 5,737,972 A * | 4/1998 | Jenssen | B60R 1/068 74/502.1 |

(Continued)

FOREIGN PATENT DOCUMENTS

| | | |
|---|---|---|
| EP | 1020328 A2 | 7/2000 |
| EP | 1621404 A1 | 2/2006 |

OTHER PUBLICATIONS

International Search Report PCT/US2013/039236, dated Sep. 9, 2013.

*Primary Examiner* — Bumsuk Won
*Assistant Examiner* — Jeffrey Madonna
(74) *Attorney, Agent, or Firm* — Manatt, Phelps & Phillips, LLP

(57) ABSTRACT

A mirror assembly includes an adjustable support system for supporting a mirror. The adjustable support system includes a first peripheral support element and a second peripheral support element, each having an adjustable height, and optionally a third, central support element having a fixed height. Each of the first and second peripheral support elements is coupled with a respective linear actuator for adjusting their respective heights, thereby adjusting and/or rotating the mirror. In some embodiments, additional peripheral elements are included at opposite sides of each of the first and second peripheral support elements to provide additional balance and/or dampening when the mirror is adjusted.

20 Claims, 13 Drawing Sheets

(56) References Cited

U.S. PATENT DOCUMENTS

| | | | | |
|---|---|---|---|---|
| 5,745,310 | A * | 4/1998 | Mathieu | B60R 1/025 359/841 |
| 5,909,326 | A * | 6/1999 | Leonberger | B60R 1/066 359/841 |
| 6,050,537 | A | 4/2000 | Fimeri | |
| 6,264,338 | B1 * | 7/2001 | MacFarland | B60R 1/06 359/838 |
| 6,402,329 | B1 * | 6/2002 | Bailly | G02B 7/1822 248/476 |
| 7,631,848 | B2 | 12/2009 | Enochs | |
| 2006/0152828 | A1 * | 7/2006 | Sestokas | B60R 1/07 359/841 |
| 2011/0280700 | A1 | 11/2011 | Uttech et al. | |
| 2014/0192432 | A1 * | 7/2014 | Dalton | B60R 1/072 359/877 |

\* cited by examiner

MIRROR ASSEMBLY AND ADJUSTMENT MECHANISM THEREOF

CROSS REFERENCE TO RELATED APPLICATIONS

This application claims priority to U.S. Provisional Application No. 61/641,581, filed May 2, 2012, the disclosure of which is incorporated by reference in its entirety herein.

BACKGROUND

This invention concerns exterior mirrors for vehicles, and especially large-size and/or heavy exterior rearview mirror assembly for use with vehicles used in rough or harsh environments such as mining or construction vehicles which are subject to large amount of vibrations and shocks when operating.

Conventional rearview mirror assemblies used on passenger cars, vans, or motor trucks include mechanical or electro-mechanical actuators for adjusting the reflective element, e.g., a mirror glass. Typical rearview mirror assemblies include a spherical assembly that is centered on a mirror glass or mirror glass carrier. However, these rearview mirror assemblies tend to be complicated and difficult to manufacture and assemble, and can be unsuitable for applications when the mirror glass and/or mirror carrier require additional support. We have determined that such mirrors are vulnerable to shocks, vibrations, or other loads impinging on the mirror, which can cause damage to the support elements or actuators, or cause the mirrors to move to unwanted positions or view angles. We have determined also that there are other drawbacks, including the high degree of friction required in the mechanism of a centered actuator to create enough inertia for the mirror not to move as a result of shocks or impacts.

SUMMARY OF THE INVENTION

The present invention provides an adjustable support system and a mirror assembly including the adjustable support system, as well as methods of manufacture and use of the mirror assembly. In some embodiments, the adjustable support system includes first and second peripheral support elements. In some embodiments, the first and second support elements are heightwise adjustable. In some embodiments, a third central support element with a fixed height is also provided. In some embodiments, the first and second support elements are coupled with an actuator (e.g., a linear actuator) for adjusting their respective height, thereby causing the mirror to be adjusted, such as rotate by a first axis or a second axis.

In some embodiments, the adjustable support system further includes a fourth and a fifth support element located on the opposing sides of the first and the second support elements to provide balance and dampening when the mirror is adjusted. The fourth and the fifth support elements do not need to be coupled with actuators.

In some embodiments, the mirror assembly includes a mirror (which includes a reflective element and a carrier portion separate or integral therewith) and the adjustable support system described herein. The mirror assembly can further include a housing to enclose the mirror and the adjustable support system therein, and to mount the mirror assembly to an external object via a mounting structure. In some embodiments, the mirror assembly can further include a flexible skirt, boot and/or other protective covering coupled with the mirror and at least partially enclosing the adjustable support system, and substantially enclosed by the housing. In some embodiments, the mirror assembly can include reinforcing ridges adjoining and/or integrated or molded within the base and/or the side wall of the housing.

In some embodiments, the mirror assembly includes a plurality of boots and/or other protective covering, each enclosing one of the first support element, the second support element, the first linear actuator, and the second linear actuator. In some embodiments, the mirror assembly includes a plurality of boots, at least one of the boots enclosing the first support element and the first actuator, and at least another of the boots enclosing the second support element and the second linear actuator. In some embodiments, the mirror assembly includes at least one boot to cover at least one of: the first support element, the first linear actuator, the second support element, and the second linear actuator. In some embodiments, the support elements and the actuators include, or are mounted on, mounting or support plates which are then mounted on the base of the housing.

In some embodiments, a method for assembling a mirror assembly is provided. The method includes the sequential, non-sequential and/or sequence independent steps of coupling at least one support plate to the housing, coupling a first adjustable support element to the at least one support plate to support the mirror at a first location, coupling a second adjustable support element to the at least one support plate to support the mirror at a second location, coupling a first actuator configured to adjust the mirror in a first configuration about a first axis to the at least one support plate thereby adjusting at least the first adjustable support element, coupling a second actuator configured to adjust the mirror lens support and the mirror lens in a second configuration about a second axis to the at least one support plate thereby adjusting at least the second adjustable support element. In some embodiments, the method further includes coupling the reflective element of the mirror with the carrier portion of the mirror, where the mirror carrier portion is used to couple to each of the first support element and the second support element. In some embodiments, the method further includes coupling a third support element to the at least one support plate to support the mirror at a third location.

In some embodiments, a method of using an adjustable mirror assembly as described above is provided. The method includes the sequential, non-sequential and/or sequence independent steps of activating the first linear actuator to cause an advancement or retraction of a movable element of the first linear actuator, thereby adjusting a height associated with the first support element to cause the mirror to rotate about a first axis; and activating the second linear actuator to cause an advancement or retraction of a movable element of the second linear actuator, thereby adjusting a second height of the second support element to cause the mirror to rotate about a second axis.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings.

DETAILED DESCRIPTION

Figure 1A:
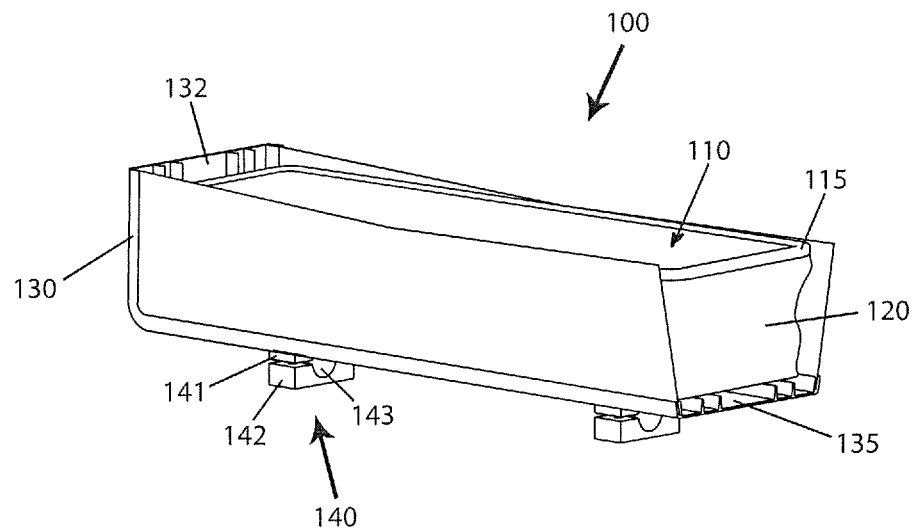
FIGS. 1A and 1B depict general outward appearance of certain embodiments of the mirror assembly of the present invention (1A: showing partial side wall of the housing; 1B: showing only an end section of the side wall of the housing)

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Figure 1B:
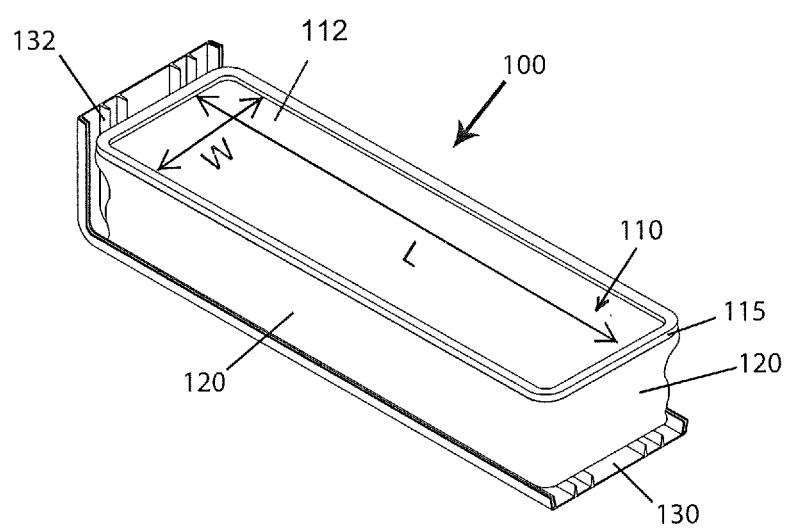

Referring to FIG. 1A, an embodiment of mirror assembly 100 of the present invention is illustrated. The mirror 110 includes a reflective element 112 (e.g., a mirror glass, lens, etc.) supported by a mirror carrier portion or support portion 115. Although only a frame enclosing the perimeter of the mirror is shown for mirror carrier portion 115, it is understood that the mirror carrier portion can be integral with the reflective element, or can be a separate a panel or backing attaching to the backside of the reflective element 112, e.g., by adhesive, welding, bolt, screw, or other commonly used techniques depending on the material and the construction of the backside of the reflective element. As used herein, the mirror carrier portion generally refers to the portion of the mirror used for strengthening or protecting the reflective element, and/or connecting the mirror to the adjustable support system as will be described further below. FIG. 1B shows an alternative view of the mirror assembly according to some embodiments of the invention where only one end cover (part of the side wall 132) of the housing 130 is shown.

The reflective element 112 of the mirror assembly can be configured in any shape. In one embodiment, the mirror takes a substantially rectangular shape as depicted herein, which has a length (L) and a width (W). For example, the mirror can be 40 inches long and 12 inches wide, or 48 inches long and 14 inches wide. Greater or smaller lengths/widths of the mirror can be selected as needed or desired. The mirror (including the mirror carrier portion) can weigh 30 pounds or more. The overall mirror assembly including the mirror, housing, and the mirror support elements, can weigh 100 pounds or more.

In some embodiments, the mirror 110 is enclosed on its perimeter with a flexible skirt and/or other protective covering 120 which can create a substantial seal for the internal structures of the mirror assembly (e.g., to prevent water, dirt, ice, or other objects from entering the interior of the mirror assembly), while allowing the reflective element 112 to be tilted or rotated to desired positions/orientations. The flexible skirt 120 can be made of an elastic material, for example, a rubber material, a fabric, a plastic material, etc.

In some embodiments, as illustrated in FIGS. 1A and 1B, a more rigid and hardy housing 130 or casing of the mirror 110, which includes sides wall 132, is provided outside of the flexible skirt 120. The housing 130 can be made of hard plastic, metal, carbon fiber, glass fiber, polymeric or composite materials, or mixtures thereof, or different materials for different sections of the housing, and optionally include reinforced structures and/or ribs that are integrated and/or connected thereto as illustrated, for example, in the drawings. Other methods and/or structures may optionally be used to reinforce the housing. The housing includes a base 135 which can serve as the platform for installing various support elements inside of the mirror assembly.

In some embodiments, mounted on the back of the base 135 are a pair of mounting braces 140, which are used to mount the mirror assembly onto another object, e.g., the exterior of a vehicle (such as a truck) via a mounting structure. The mounting brace 140 includes a first part 141 attached to the back of the base 135 (e.g., by welding, adhesion, screw, or otherwise), and a second part 142 which can be secured to the first part with screws, bolts, or other fixation structures commonly used in the art. The two parts 141 and 142 are shaped such that when they are assembled, there is an opening 143 formed therebetween, the size of which can be configured to hold a mounting bar of the mounting structure (see FIG. 11 and description thereof, below). In some embodiments, different standard mounting assemblies may be used to mount the mirror assembly onto an exterior surface of the vehicle.

Figure 2A:
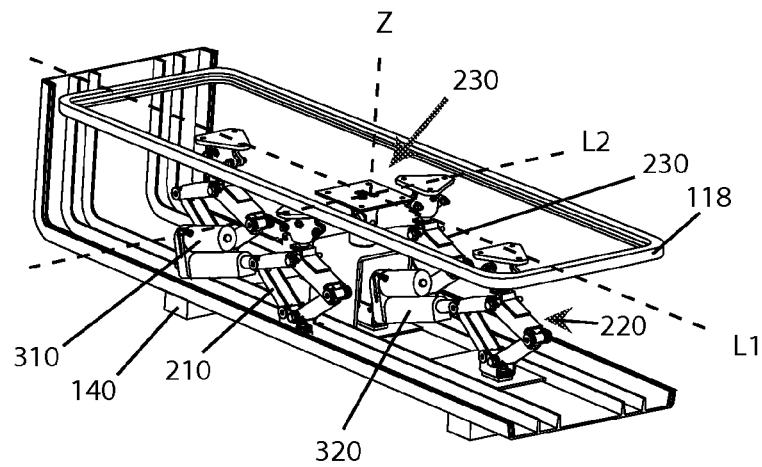
FIG. 2A is a schematic perspective view of certain interior elements of an embodiment of mirror assembly of the present invention.

FIG. 2A shows a schematic view of certain interior elements of the mirror assembly as shown in FIGS. 1A and 1B according to some embodiments of the invention. To more clearly show the interior structure, the reflective element of the mirror is removed from the view, while only a frame 118 of the mirror (part of the mirror carrier portion) is shown to indicate the position of the mirror relative to the internal elements.

The internal elements include, for example, an adjustable support system for a mirror (or more broadly, any substrate, such as a panel, a plane, etc., that is mountable to the support system), which includes: a first support element 210, a second support element 220, and a third (central) support element 230. By "central" it is not meant that the third support element must be located at the center of the mirror, but that it is located closer to the center of the mirror than at least the first support element or the second support element. In some embodiments, the support elements can be positioned at different locations within the housing and/or mirror support and/or mirror. Each of the support elements is coupled with the carrier portion of the mirror or mirror element 110 (reflective element not shown), e.g., by screws, welding, gluing, and other techniques as appropriate. In some embodiments, the mirror carrier can be assembled to the actuation assembly. The combined mirror carrier and actuation assembly can be subsequently attached to the housing by fastening it through holes in the carrier allowing a tool to be inserted through those holes to attach the nuts to studs already mounted to the bottom of the housing. The glass can then be slid and/or placed into the carrier. In some embodiments, the actuation assembly can already be attached in the housing prior to attaching the mirror carrier. In some embodiments, the glass is installed last no matter what the other sequences.

Figure 2B:
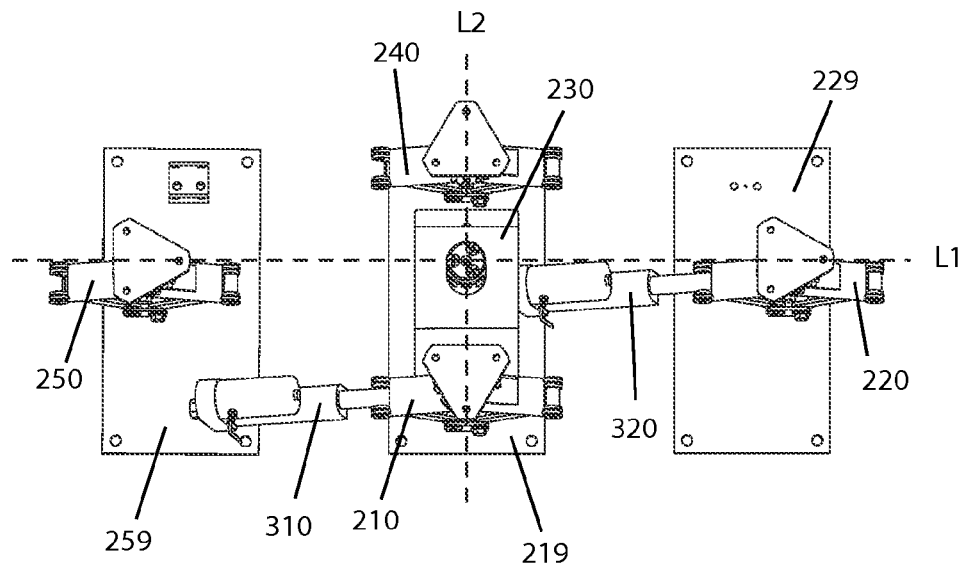
FIG. 2B is a schematic top view of support elements of an embodiment of adjustable supporting system of the present invention.

In some embodiments, the line connecting the first support element 210 to the central support element 230, L2, is orthogonal or substantially orthogonal to the line connecting the second support element 220 to the central support element 230, L1. This arrangement may be viewed more clearly in FIG. 2B, which is a top view of the adjustable support system (with the mounting brackets of the supporting elements removed from view). In this arrangement, the second support 220 can be located on a center line of the mirror along the length direction L1, while the first support 210 located on a center line of the mirror along the width direction L2.

The first support element 210 is coupled with a first linear actuator 310 such that the height of the first support element 210 can be adjusted by the linear actuator 310. This adjustment can cause the mirror (not shown) to rotate about the axis L1, as the height of the central support is fixed. Similarly, the second support element 220 is coupled with a second linear actuator 320 such that the height of the second support element 220 can be adjusted by the linear actuator 320. This adjustment can cause the mirror (not shown) to rotate about the axis L2. In some embodiments, any number of actuators may optionally be used. In some embodiments, one or more standard actuators in addition to, or instead of, the linear actuators may optionally be used. In some embodiments, the one or more actuators are connected directly to the mirror or mirror carrier.

The adjustable support system can further include a fourth support element 240 located on the opposite side of the first support element 210 with respect to the third support element 230. For example, the first support element 210 and the fourth support element 240 can be situated symmetrically with each other with respect to the third support element 230. Similarly, a fifth support element 250 (with a mounting plate 259) can be included at a location on the opposite side of second support element 220 relative to the third support element 230. Preferably, the second support element 220 and the fifth support element 250 are situated symmetrically with each other with respect to the third support element 230. (Each of the first, second, fourth, and fifth support elements is also referred to herein as a peripheral support element.) The fourth and fifth support elements 240 and 250 can serve as counter balance and/or dampening functions when the mirror is rotated about L1 or L2 to improve the stability of the mirror. It is not necessary for the fourth support element 240 or the fifth support element 250 to be coupled with any active elements such as linear actuators, but such active elements can still be used if needed or desired. In some embodiments, the supports are pre-set or pre-tightened to a predetermined tension and/or friction and/or tightness to provide balance and/or cushioning. In other embodiments, the supports are not pre-set to any particular stiffness. In some embodiments, any number of fixed and/or adjustable support elements may be used in different locations within the housing. In some embodiments, one or more of the elements in the adjustable support system (e.g., the first, second, third, fourth, and fifth support elements, the first actuator, the second actuator) can each be individually protected by a boot or covering which is configured as a seal to enclose the element. Alternatively, one boot can be configured to enclose/protect proximately located components or connected components as a group, such as the first support element and the first actuator together as a whole. The boots can be made from the materials for the flexible skirt as discussed above, and used in addition to, or in lieu of the flexible skirt.

Figure 3:
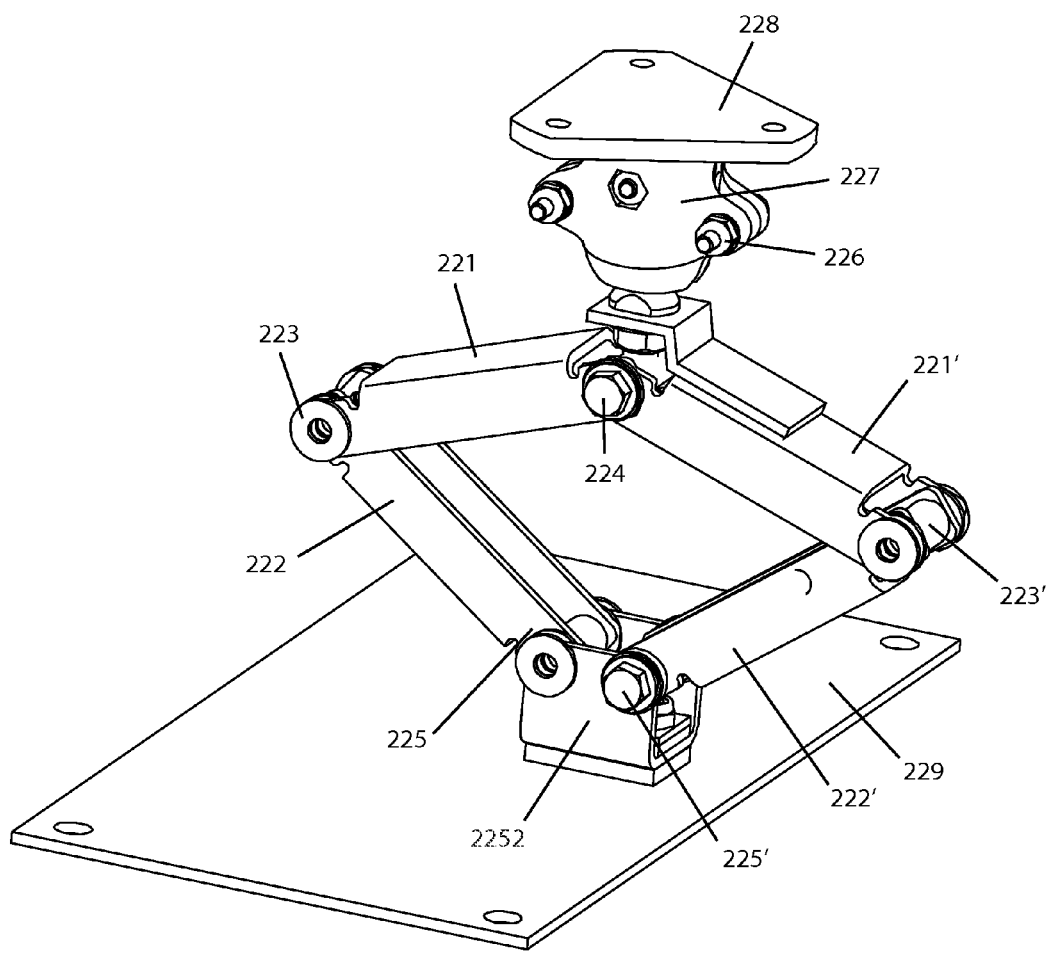
FIG. 3 is a larger view of a peripheral support element of the adjustable supporting system depicted in FIGS. 2A and 2B.

FIG. 3 shows a detailed view of a support element 220, which includes a scissor like structure that has a first leg 221 and a second leg 222, the first leg 221 and the second leg 222 pivotally joined at a first joint 223 (the pin or bolt for the pivotal joint not shown), which can be coupled to a shaft of a linear actuator (to be more fully described in connection with FIG. 4 below). The first leg 221 has a movable end 224, and the second leg 222 has a fixed end 225 pivotally coupled to a bracket 2252 attached on the mounting or support plate 229 which is in turn attached to the base of the mirror housing (not shown). The fixed end 225 does not move with respect to the mounting or support plate 229 (or the base of the mirror assembly) except that it can rotate to change the angle of the second leg 222 relative to the mounting or support plate. In some embodiments, one or more different types of standard support elements may optionally be used.

It is understood that the support elements and the actuators can also be mounted on the base of the housing directly (without using mounting/supporting plates as depicted), or mounted to one or more sturdy spines that can be of any material which may be mounted to the base or other structures of the housing.

As shown in FIG. 3, the support element 220 can also optionally include a third leg 221' and a fourth leg 222' which are pivotally joined at the second joint 223', which may form a closed diamond, square or rectangular shape depending on the positioning of the support element 220. Similar to the second leg 222, the fourth leg 222' also pivotally joins with the mounting bracket 2252 at an fixed end 225'. When the third leg 221' and the fourth leg 222' are present, the first leg 221 can also be pivotally joined with the third leg 221' at the movable end 224, which is then coupled with a ball-and-socket swivel type joint structure 227 (the tension of which can be adjusted by fastening members 226), which in turn is coupled with a mounting bracket 228 for mounting the support element 220 onto the mirror 110 (not shown). Other type of structure for joint 227 can be used, e.g., a standard universal joint, which does not provide the friction/dampening of a ball-and-socket swivel type joint. The lengths of the legs 221, 222 (and 221', 222' if present) can be chosen such that the legs can move with respect to the base of the housing in a concerted fashion. For example, the lengths of all the legs can be selected to be equal to each other. Alternatively, the lengths of the legs can be chosen to be different values. For example, the length of the first leg 221 and that of the third leg 221' can be chosen to be of the same value, and the length of the second leg 222 and that of the fourth leg 222' can be chosen to be same to each other, and different from the lengths of legs 221/221'. The other peripheral support elements 210, 240 and 250 can be configured similarly to support element 220 as described above.

Figure 4A:
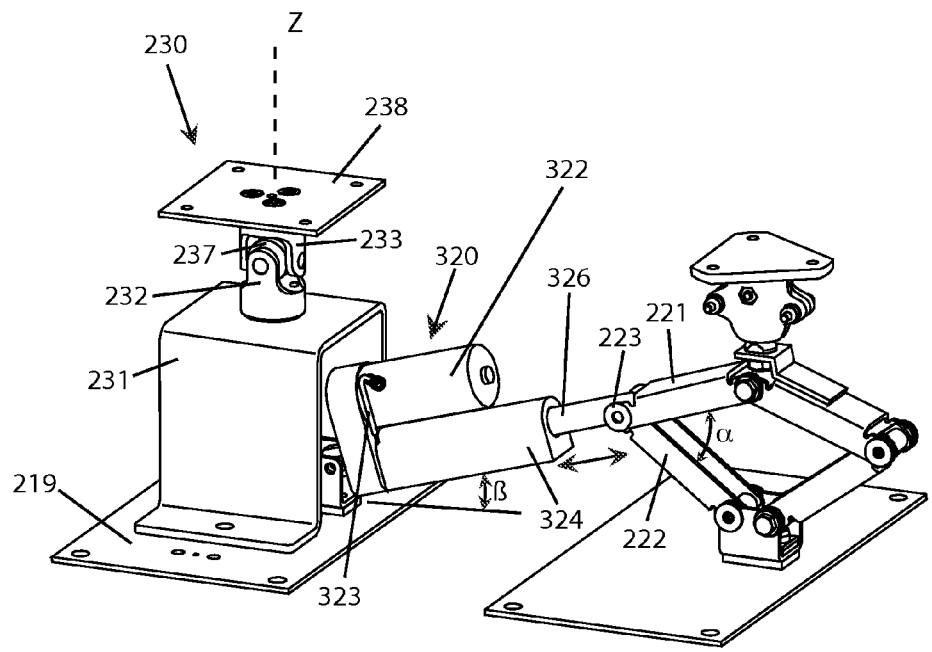
FIG. 4A is a larger view of a peripheral support element, a linear actuator coupled to the peripheral support element, and a central support element of the adjustable supporting system depicted in FIGS. 2A and 2B.
Figure 4B:
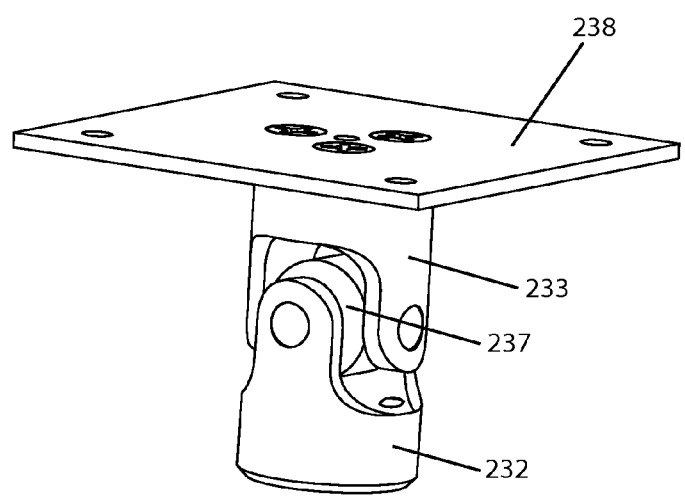
FIG. 4B is close-up view of a portion of a central support depicted in FIG. 4A.

FIG. 4A depicts the support element 220 as coupled at the joint 223 with a movable shaft 326 of a linear actuator 320. The movable shaft 326 is partially enclosed in a cylindrical chamber (or shaft housing) 324 and can be moved outwardly (advanced) or inwardly (retracted) using a motor (not shown) housed in the motor chamber 322 of the actuator 320, the motor being electrically powered through wire 323. The other end of the linear actuator 320 is pivotally installed on the base of the housing of the mirror assembly, e.g., via a common mounting plate (219 in FIG. 2B) on which the first support element 210, the third support element 230, and the fourth support element 240 are attached. The advance of the shaft 326 increases the angle α between the first leg 221 and the second leg 222 of the second support element 220, causing the distance between the movable end 224 and the fixed end 225 (also referred to as the height of the support element 220) to increase, which results in the rotation of the mirror 110 about the axis L2 (shown in FIG. 2A) in a counterclockwise direction (viewed from the front). The retraction of the shaft 326 decreases the angle α between the first leg 221 and the second leg 222 of the second support element 220, causing the distance between the joint 224 and the fixed end 225 to decrease, which results in the rotation of the mirror about the axis L2 (shown in FIG. 2A) in a clockwise direction. The height adjustment of the first support element 220 also causes the angle β formed between the shaft 326 of the actuator 320 and the mounting plate 219 (or the base of the mirror housing) to change accordingly. The connection between a linear actuator and an associated support element provides stability for the mirror because shocks and/or loads applied near the mirror perimeter can be substantially transferred to the shaft of the linear actuator (along the shaft direction as a push or pull force), which can withstand large external linear forces, e.g., hundreds of pounds, without moving.

In a similar fashion (not shown), the advance and retraction of a movable shaft of the first actuator 210 causes the adjustment of the height of the first support element 210, thereby resulting in the rotation of the mirror about the axis L1 (shown in FIG. 2A). Thus, with the two linear actuators coupled with the two orthogonally arranged peripheral support element (210 and 220), the mirror can be adjusted to take a large range of angles (limited by the maximum and minimum heights obtainable by the support elements). The combination of linear actuators and support elements can further enable the adjustment of the magnitude and speed of the adjustment by varying the stroke length of the linear actuator and/or the length of the legs of the scissor.

Although standard linear actuators are depicted and described herein, it is understood that other types of actuators or linear actuators are also suitable. In one embodiment, the projections of the legs and the shafts of the linear actuators are all aligned along the length direction of the mirror. Such an arrangement can reduce crowding of the control structures and allow a compact design. Further, in this embodiment, the support elements are configured to be not rotatable about the Z axis which is perpendicular to the base of the housing. In such a manner, the mirror will not rotate to contact the housing of the mirror assembly.

FIG. 4A also shows an exemplary structure of the third support 230 whose height is fixed. As shown, the third support 230 includes a base stand 231 shaped to create a space for accommodating a part of the second linear actuator 320. The base stand is attached to a mounting plate 219 (which also underlies the first support element 210). It is understood that this configuration is a mere example depending on the installation position of the second linear actuator 320, and various other configurations can be used as needed. A support column 232 extends from the top of the base stand 231 and is coupled with a second column 233 using a joint structure, such as a universal joint 237 as depicted. The second column 233 is further coupled to a mounting bracket 238 (e.g., via screws, see FIG. 4B) for attachment with the mirror 110 (not shown). The universal joint 237 allows the second column 233 to rotate about the L1 or L2 axis, but disallows its rotation about the Z axis.

Figure 5:
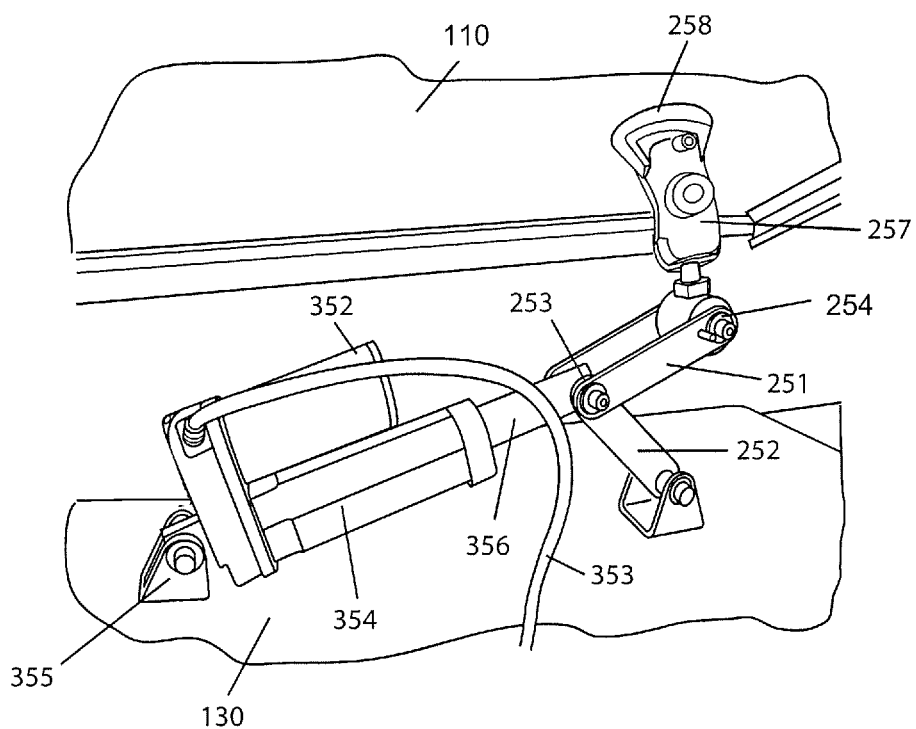
FIG. 5 depicts a peripheral support element coupled to a linear actuator in an alternative embodiment of adjustable supporting system of the present invention.

FIG. 5 depicts an alternative embodiment of a support element 250 which includes a first leg 251, and a second leg 252 pivotally joined with the first leg 251 at joint 253. The movable end 254 of the first leg 251 is pivotally coupled with a ball-and-socket swivel type joint structure 257, which is coupled with a mounting bracket 258 for attachment to mirror 110. The joint 253 is pivotally coupled with a shaft 356 movable inward and outward of a chamber 354 of a linear actuator 350. The motor of the actuator 350 is housed in the motor chamber 352, and electrically powered via a wire 353. The end 355 of the linear actuator 350 distal to the movable end of the shaft 356 is pivotally coupled with the base of the mirror housing.

Figure 6:
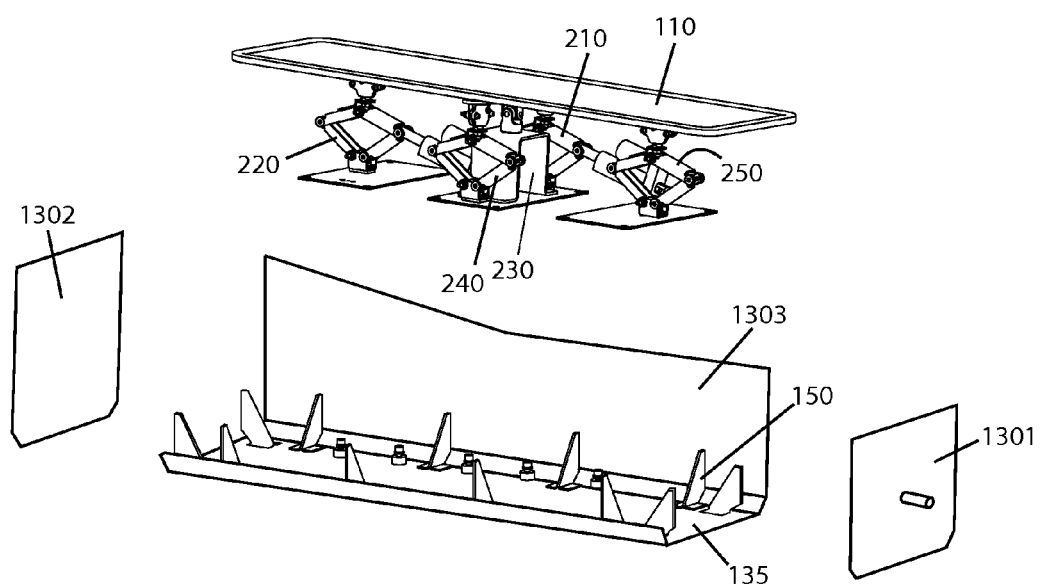
FIG. 6 is an exploded view of an embodiment of the mirror assembly of the present invention.

FIG. 6 shows an exploded view of an embodiment of a mirror assembly of the present invention. The adjustable support system including support elements and linear actuators as described above, together with attached mirror 110, are shown detached from the housing of the mirror assembly. The side wall of the mirror housing is shown in several sections, including a side section 1303, a first end section 1301, and a second end section 1302, which is larger in area than the first end section 1301. A plurality of strengthening or reinforcing ridges 150 (made from metal, engineering plastics or composites, etc.) adjoin the side wall and the base of the mirror housing for enhancing the structural robustness of the housing.

Figure 7A:
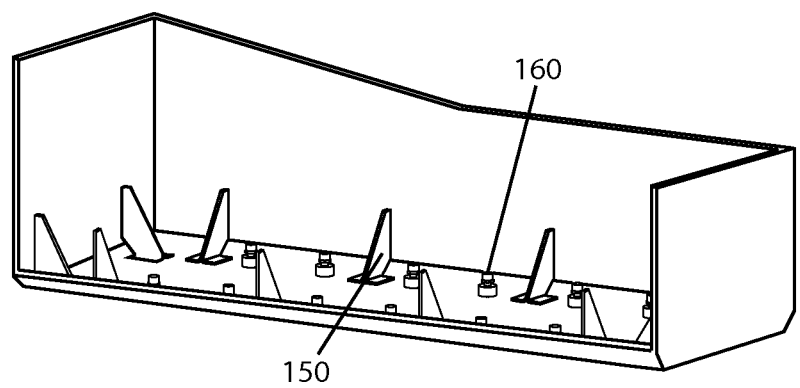
FIG. 7A is a depiction of a mirror assembly housing with strengthening elements and fixation elements.
Figure 7B:
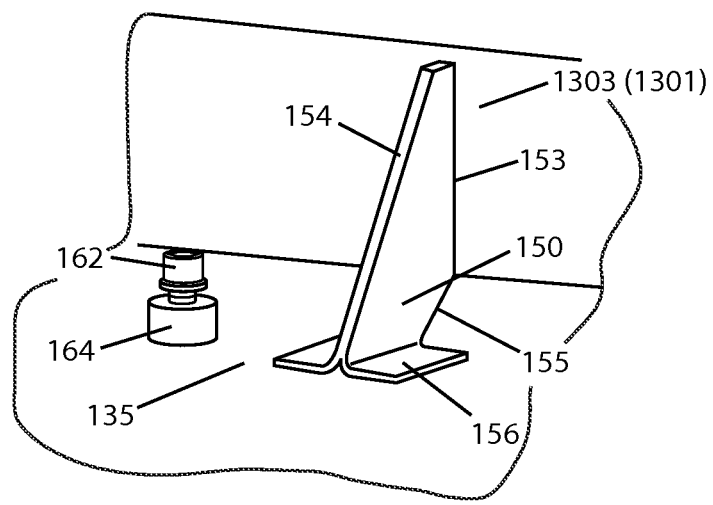
FIG. 7B is a close-up view of a portion of FIG. 7A to show the strengthening elements and fixation elements in more detail.

The configurations of the ridges 150 relative to the side wall and base of the mirror housing are shown in more detail in FIG. 7A, which is a perspective view of the housing with one section of the side wall removed from the view. Also shown in FIG. 7A are a plurality of bushings and bolts structures 160 for securing the mounting/supporting plates of the support elements (210, 220, 230, 240, 250 shown in FIG. 2) and linear actuators (310 and 320) to the base of the housing. FIG. 7B is a close-up view of a small area of FIG. 7A, showing a strengthening ridge having a body portion 152 with a first edge 153 for attaching to the side wall 1303 (or 1301), a second edge 154 and a third edge 155 each forming an oblique angle with respect to the side wall 1303 (or 1301), and a double-tail portion 156 attached to the base 135 of the housing. The strengthening ridges can be coupled to the side wall and the base by welding, adhesive, or other commonly used techniques as appropriate and depending the material used for the housing and the ridges. In alternative embodiments, the side wall of the mirror assembly can be made from resin or other polymeric materials, and coupled to the base of the housing using snaps (or molded together with the base of the housing) without using strengthening ridges.

The bushing 164 is attached to the base of the housing via welding, adhesion, screw, other known connection techniques, and the bolt 162 can have a matching size and thread to be fastened into the bushing 164. Thus, after the components of the adjustable support system, i.e., the support elements and the actuators, are assembled with the respective mounting plates (shown in FIG. 2), these components can be easily installed on the base of the housing by placing the mounting plates on the bushings, and then fastening the mounting plates using bolts 162. Alternatively, one or more of the mounting plates can be first installed on the base, and then other components of the adjustable support system installed on the mounting plates. The bushings can be replaced by studs and/or bolts integral or attached on the base of the housing, and the mounting plates can be installed on the studs/bolts via through holes and secured with covers or nuts.

Figure 8A:
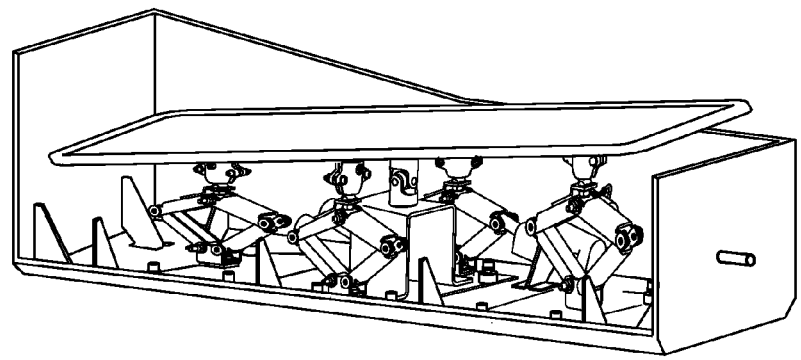
FIGS. 8A-8C are different views of a mirror as adjusted by using a linear actuator coupled to a peripheral support element.
Figure 8B:
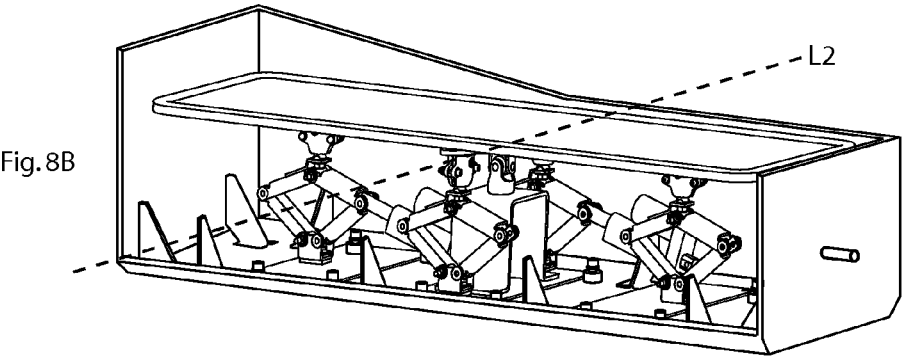
Figure 8C:
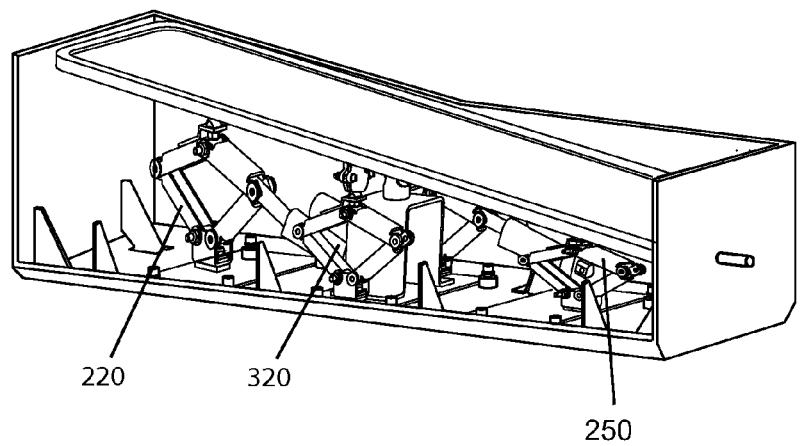

FIGS. 8A-8C illustrate the adjustment of mirror positions by using a linear actuator 320 coupled to a peripheral support element 220. By controlling the linear actuator (i.e., advancing or retracting the movable shaft coupled to the support element), the height of the support element 220 is raised or lowered (the passive support element 250 on the opposing side of the mirror is lowered or raised accordingly). As a result, the mirror can be adjusted to different positions by rotating about the axis L2 (shown in FIGS. 2A/2B).

The embodiments of the mirror assembly described above can be manufactured or assembled in various ways. The components of the mirror assembly can alternatively be assembled in a top-down, bottom-up, or other sequences. In one embodiment, the assembly process includes coupling a support plate to the housing, coupling a first adjustable support element to the at least one support plate to support the mirror at a first location, coupling a second adjustable support element to the at least one support plate to support the mirror at a second location, coupling a first actuator configured to adjust the mirror in a first configuration about a first axis to the at least one support plate thereby adjusting at least the first adjustable support element, coupling a second actuator configured to adjust the mirror lens support and the mirror lens in a second configuration about a second axis to the at least one support plate thereby adjusting at least the second adjustable support element. In some embodiments, the method further includes coupling a third support element to the at least one support plate to support the mirror at a third location. In further embodiments, the method includes coupling a fourth and a fifth adjustable support elements to the support plate and the mirror. It is understood that the method need not be performed sequentially as recited above, but rather can be carried out in different orders as appropriate or desired. For example, the linear actuators can be first coupled with their respective adjustable support elements, and then coupled to the support plate. The mirror can be first coupled to the support elements before the support elements (and the actuators) are installed on the base of the housing, or the mirror can be coupled to the support elements after the support elements (and the actuators) are installed on the base of the housing. As the reflective element of the mirror assembly may be prone to break, in some embodiments, it can be installed after other components are assembled, e.g., by sliding the reflective element in a guiding groove in a frame of the mirror carrier portion.

The mirror assembly as described above can be mounted on various objects or locations where rearview is desired or needed, such as on a vehicle, a wall, a building structure, and the like. In the following, the mounting of the mirror assembly on a vehicle is illustrated.

Figure 9:
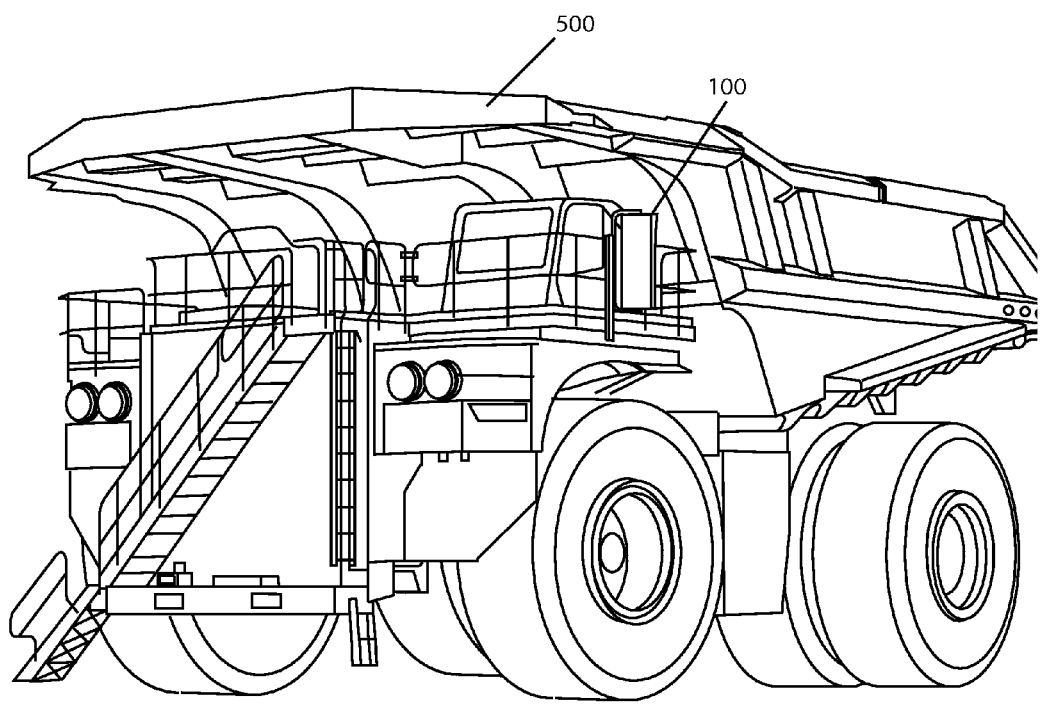
FIG. 9 is a schematic view of a vehicle with a mirror assembly mounted.
Figure 10:
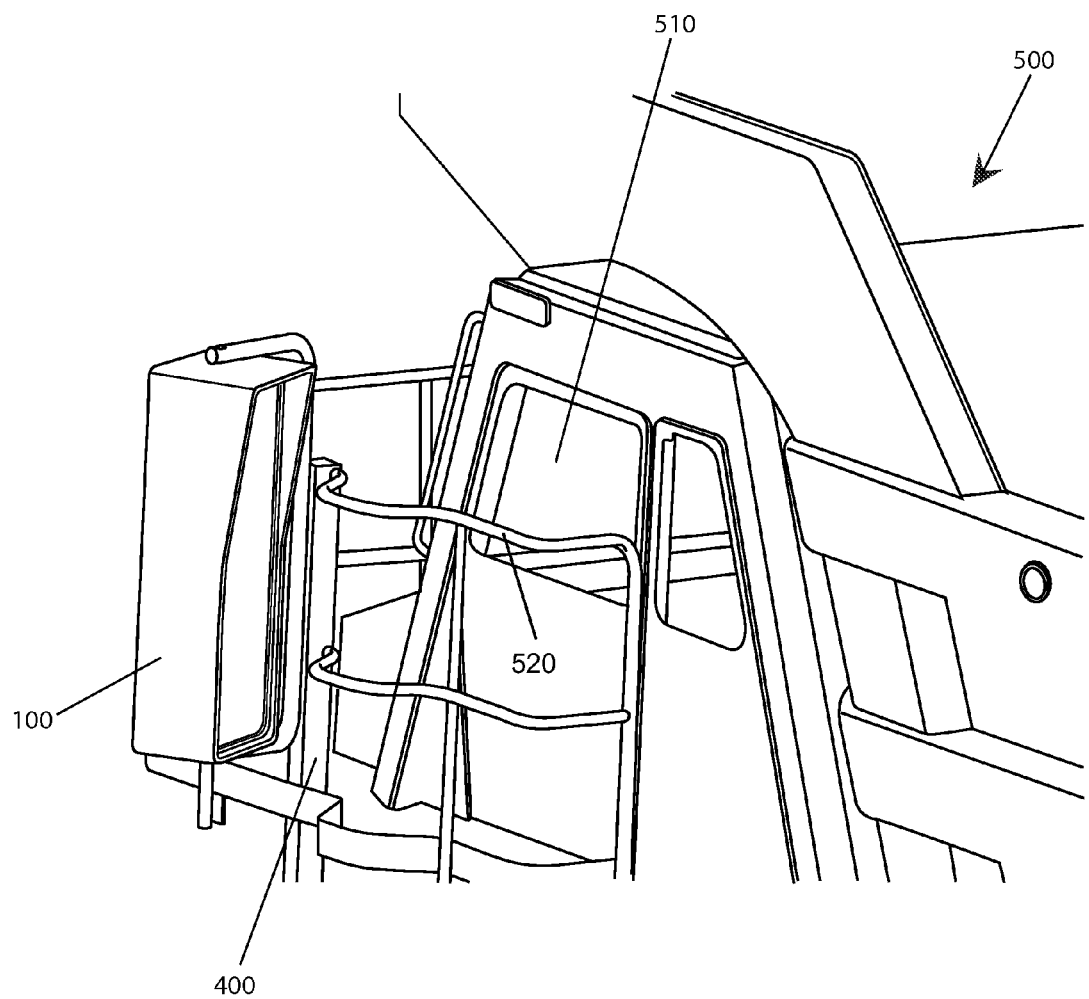
FIG. 10 is a schematic view of an embodiment of the mirror assembly of the present invention as mounted outside a driver's compartment of a vehicle.

FIG. 9 is a schematic depiction (front view) of a vehicle 500 (such as a truck) mounted with the mirror assembly 100 described above via a mounting structure 400. FIG. 10 is an alternative view of the mirror assembly 100 mounted via a mounting structure 400 on a rail structure 520 located outside a driver's compartment 510 of a vehicle 500.

Figure 11:
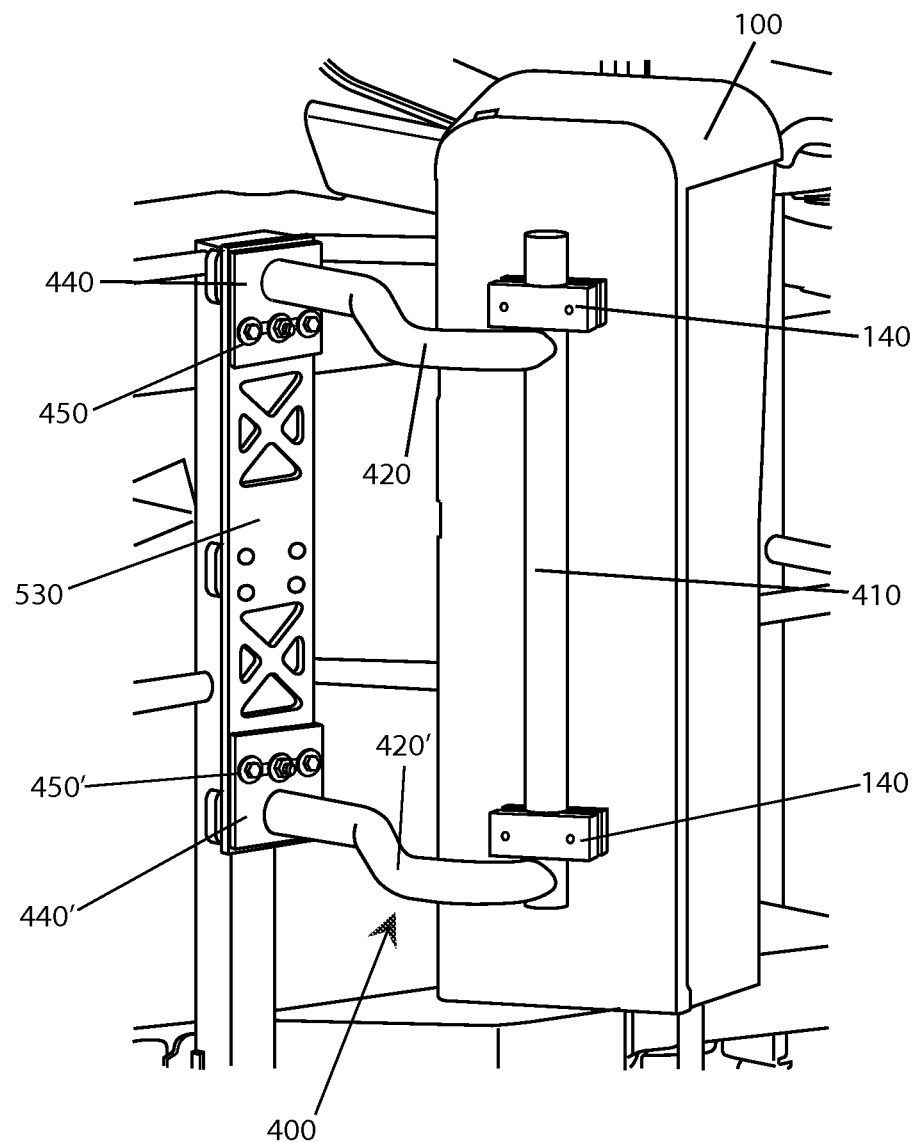
FIG. 11 is a rearward view of an embodiment of the mirror assembly of the present invention installed on a vehicle with a mounting structure.

FIG. 11 is a rearview of mirror assembly 100 showing the coupling of the mounting braces 140 (described above in connection with FIG. 1) with a mounting structure 400. The mounting structure includes a bar 410 to engage with the mounting braces 140, a pair of arms 420, 420', which may include curved portions, and two mounting pads 440, 440' (one for each mounting arm). The mounting pads 440, 440' are coupled to the mounting plate 530 (which is part of an exterior structure of the vehicle) via fixation structure 450, 450'. For securing the connection, multiple bolts can be used for each mounting pad, as shown in FIG. 11.

The mounting bar 410 and arm 420 can be tubular, the hollow interior of which can be used to accommodate the power line or wire of the linear actuators (see e.g., FIG. 4A and FIG. 5), which can extend out of the mirror assembly through an opening from the base of the housing, negotiate through the interior of the mounting bar 410 and arm 420, and connect to a power source located on the vehicle, as well as to a control switch (e.g., a joystick type switch having up/down/left/right directions) located in the driver's compartment and easily accessible by a driver of the vehicle. In some embodiments, other types of standard mounting configurations my alternatively be used.

Figure 12:
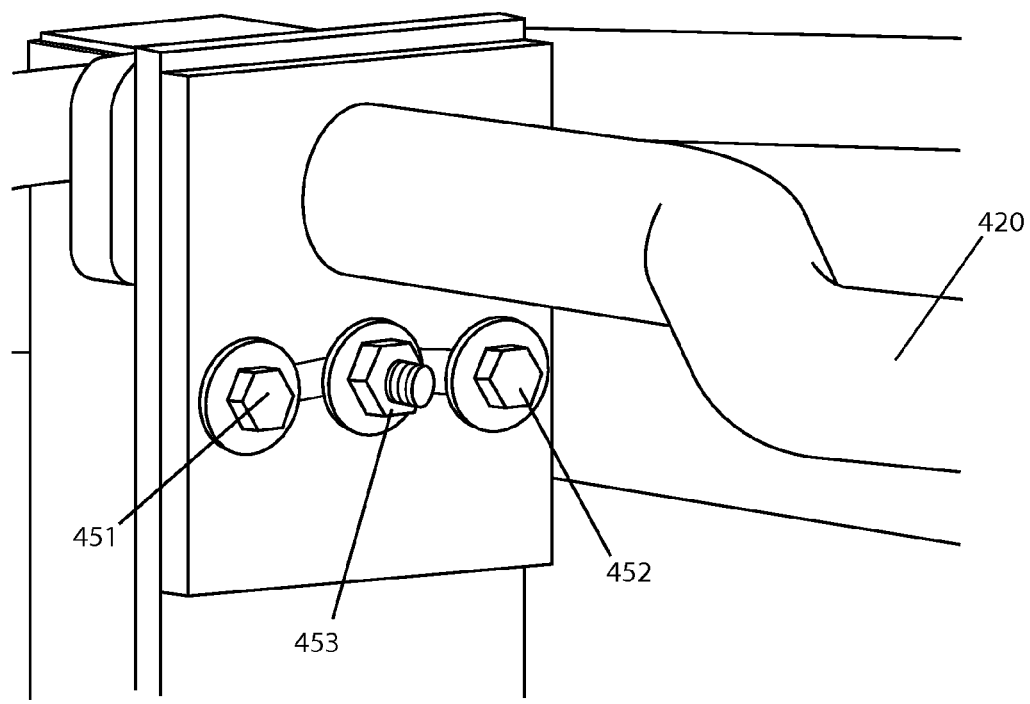
FIG. 12 is a close-up view of a mounting structure for mounting a mirror assembly to a vehicle.
Figure 13A:
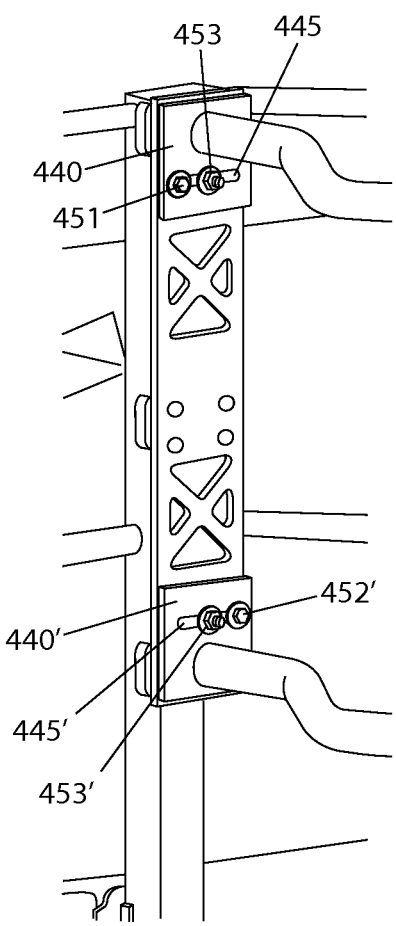
FIG. 13A is a schematic depiction of a part of a mounting structure for a mirror assembly that allows pivoting of the mirror assembly.
Figure 13B:
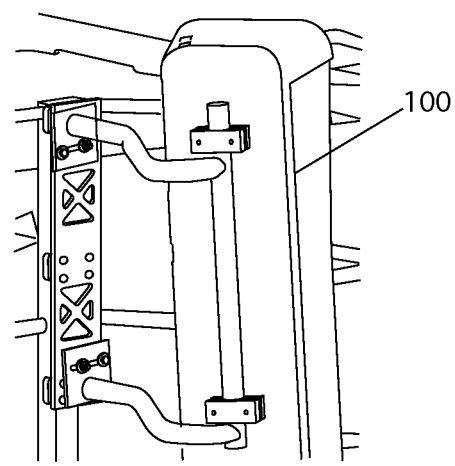
FIG. 13B is a rearward view of a mirror assembly mounted by a mounting structure depicted in FIG. 13A after pivoting the mounting structure.

FIG. 12 is a close-up view of the mounting structure showing the mounting arm 420, and the fixation structure including bolts 451, 452, and bolt/nut 453. This configuration is suitable for a fixed mounting of the mirror assembly. Alternatively, if manual pivoting of the mounting structure is desired or needed, as shown in FIG. 13A, the mounting pads 440, 440' can each include a curved slot 445, 445' (the mounting bracket 530 has corresponding curved slots for the bolts to go through, not shown), and when mounting the mounting pads 440, 440', only a center bolt/nut 453 and one bolt 451 on one side of the slot 445 are installed on the mounting pad 440, and only a center bolt/nut 453' and one bolt 452' on the other side of the slot 445' are installed on the mounting pad 440'. This configuration allows the mounting pads to be pivotally adjusted for different mounting angles for the mirror assembly. As seen in FIG. 13B, the two mounting pads 440 and 440' can be adjusted to misalign with the mounting plate 530, resulting in the mirror assembly 100 being tilted up when mounting is completed.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The invention claimed is:

1. An adjustable support system for a substrate, comprising:
a first support element having a first fixed end mounted on a first mounting plate and a first movable end, the first movable end supporting the substrate at a first location;
a second support element having a second fixed end mounted on a second mounting plate and a second movable end, the second movable end supporting the substrate at a second location;
a third support element supporting the substrate at a third location;
a first linear actuator coupled with the first support element and configured to adjust a distance between the first fixed end and the first movable end of the first support element;
a second linear actuator pivotally installed on the first mounting plate and coupled with the second support element and configured to adjust a distance between the second fixed end and the second movable end of the second support element;
wherein the first linear actuator adjusts the distance between the first fixed end and the first movable end of the first support element to cause the substrate to rotate about a first axis; and
wherein the second linear actuator adjusts the distance between the second fixed end and the second movable end of the second support element to cause the substrate to rotate about a second axis.

2. An adjustable support system for a substrate, comprising:
a first support element having a first fixed end and a first movable end, the first movable end supporting the substrate at a first location;
a second support element having a second fixed end and a second movable end, the second movable end supporting the substrate at a second location;
a third support element supporting the substrate at a third location;
a first linear actuator coupled with the first support element and configured to adjust a distance between the first fixed end and the first movable end of the first support element;
a second linear actuator coupled with the second support element and configured to adjust a distance between the second fixed end and the second movable end of the second support element;
wherein the first linear actuator adjusts the distance between the first fixed end and the first movable end of the first support element to cause the substrate to rotate about a first axis;
wherein the second linear actuator adjusts the distance between the second fixed end and the second movable end of the second support element to cause the substrate to rotate about a second axis; and
wherein the first support element includes at least a first leg and a second leg pivotally joined at a first joint, and wherein the first linear actuator is coupled to the first joint.

3. The adjustable support system of claim 2, wherein the first support element further includes a third leg and a fourth leg pivotally joined at a second joint.

4. The adjustable support system of claim 3, wherein the third leg further pivotally joined with the first leg.

5. The adjustable support system of claim 1, wherein the first axis is substantially parallel with a length direction of the substrate.

6. The adjustable support system of claim 5, wherein the second axis is substantially orthogonal to the first axis.

7. The adjustable support system of claim 1, further comprising a fourth support element supporting the substrate at a fourth position, the fourth position being opposite the first location with respect to the third location.

8. An adjustable support system for a substrate, comprising:

a first support element having a first fixed end and a first movable end, the first movable end supporting the substrate at a first location;

a second support element having a second fixed end and a second movable end, the second movable end supporting the substrate at a second location;

a third support element supporting the substrate at a third location;

a fourth support element supporting the substrate at a fourth position, the fourth position being opposite the first location with respect to the third location;

further comprising a fifth support element supporting the substrate at a fifth position, the fifth position being opposite the second location with respect to the third location;

a first linear actuator coupled with the first support element and configured to adjust a distance between the first fixed end and the first movable end of the first support element;

a second linear actuator coupled with the second support element and configured to adjust a distance between the second fixed end and the second movable end of the second support element;

wherein the first linear actuator adjusts the distance between the first fixed end and the first movable end of the first support element to cause the substrate to rotate about a first axis; and wherein the second linear actuator adjusts the distance between the second fixed end and the second movable end of the second support element to cause the substrate to rotate about a second axis.

9. The adjustable support system of claim 1, wherein the first movable end of the first support element is coupled with the substrate by a ball-and-socket swivel type joint.

10. The adjustable support system of claim 1, wherein the third support element is coupled with the substrate by a universal joint.

11. The adjustable support system of claim 1, wherein the third support element includes a base stand shaped to create a space for accommodating at least a part of the first or the second linear actuator.

12. The adjustable support system of claim 1, wherein the substrate comprises a mirror including a reflective element and a carrier portion.

13. A mirror assembly comprising:

a mirror including a front side having reflective surface and a mirror carrier portion coupled with an adjustable support system according to claim 1, wherein the substrate is the mirror.

14. The mirror assembly of claim 13, further comprising a housing, the housing including:

a base to which the adjustable support system is mounted, and a side wall substantially enclosing the periphery of the mirror and exposing reflective surface of the mirror.

15. The mirror assembly of claim 14, further comprising a flexible skirt coupled with the mirror and at least partially enclosing the adjustable support system, the flexible skirt substantially enclosed by the housing.

16. The mirror assembly of claim 14, further including reinforcing ridges adjoining the base and the side wall of the housing.

17. The mirror assembly of claim 14, further including a mounting structure coupled to the housing of the mirror assembly, the mounting structure configured to be mounted on a body of a motor vehicle.

18. The mirror assembly of claim 14, further comprising a plurality of boots, each enclosing one of the first support element, the second support element, the first linear actuator, and the second linear actuator.

19. The mirror assembly of claim 14, further comprising a plurality of boots, at least one of the boots enclosing the first support element and the first actuator, and at least another of the boots enclosing the second support element and the second linear actuator.

20. The mirror assembly of claim 14, further comprising at least one boot to cover at least one of: the first support element, the first linear actuator, the second support element, and the second linear actuator.

* * * * *